(12) United States Patent
Su et al.

(10) Patent No.: US 10,170,068 B2
(45) Date of Patent: Jan. 1, 2019

(54) GATE DRIVING CIRCUIT, ARRAY SUBSTRATE, DISPLAY PANEL AND DRIVING METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Qiujie Su, Beijing (CN); Feng Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/519,836

(22) PCT Filed: Aug. 30, 2016

(86) PCT No.: PCT/CN2016/097310
§ 371 (c)(1),
(2) Date: Apr. 18, 2017

(87) PCT Pub. No.: WO2017/118057
PCT Pub. Date: Jul. 13, 2017

(65) Prior Publication Data
US 2018/0102102 A1 Apr. 12, 2018

(30) Foreign Application Priority Data
Jan. 5, 2016 (CN) .......................... 2016 1 0006849

(51) Int. Cl.
*G09G 3/36* (2006.01)
*G06F 3/0354* (2013.01)

(52) U.S. Cl.
CPC ....... *G09G 3/3677* (2013.01); *G06F 3/03547* (2013.01); *G09G 3/36* (2013.01);
(Continued)

(58) Field of Classification Search
CPC .......... G09G 3/3677; G09G 2320/0214; G09G 2310/061; G06F 3/03547
See application file for complete search history.

(56) References Cited

U.S. PATENT DOCUMENTS 9,479,156 B2 * 10/2016 Kwon .................. H03K 17/302
9,552,891 B2 * 1/2017 Lee ....................... G09G 3/3677
(Continued)

FOREIGN PATENT DOCUMENTS

CN 101324715 A 12/2008
CN 20130110306 A 10/2013
(Continued)

OTHER PUBLICATIONS

Bipolar Junction Transistor (Year: 1989).*
(Continued)

*Primary Examiner* — Vinh T Lam
(74) *Attorney, Agent, or Firm* — Kinney & Lange, P.A.

(57) ABSTRACT

The embodiments of the present disclosure provide a gate driving circuit, an array substrate, a display panel and a driving method. The gate driving circuit comprises: at least a Gate driver on Array (GOA) unit $GOA_n$ and a GOA unit $GOA_{n+m}$, an output terminal of $GOA_n$ being connected to an input terminal of $GOA_{n+m}$, an output terminal of $GOA_{n+m}$ is connected to a reset terminal of $GOA_n$; and an electrical leakage compensation module having two input terminals connected to output terminals of $GOA_n$ and $GOA_{n+m}$, respectively, a control terminal connected to a signal line, and an output terminal connected to a Pull-Up (PU) node of $GOA_{n+m}$, and configured to compensate for a voltage at the
(Continued)

PU node of $GOA_{n+m}$ in response to receipt of the electrical leakage compensation signal $V_{LHB}$. According to the embodiments of the present disclosure, an electrical leakage compensation module is added between two cascaded GOA units for compensating for a voltage decrease due to electrical leakage by charging the GOA unit at the next stage.

13 Claims, 7 Drawing Sheets

(52) U.S. Cl.
CPC .............. *G09G 2310/061* (2013.01); *G09G 2320/0214* (2013.01)

(56) References Cited

U.S. PATENT DOCUMENTS

| | | | | |
|---|---|---|---|---|
| 2002/0195662 | A1* | 12/2002 | Eden | H01L 23/4824 257/349 |
| 2007/0070045 | A1* | 3/2007 | Sung | G06F 3/04883 345/173 |
| 2007/0152979 | A1* | 7/2007 | Jobs | G06F 3/0236 345/173 |
| 2008/0122794 | A1* | 5/2008 | Koiso | G06F 3/0482 345/173 |
| 2008/0225007 | A1* | 9/2008 | Nakadaira | G06F 3/03545 345/173 |
| 2008/0309609 | A1* | 12/2008 | Feng | G09G 3/3677 345/101 |
| 2010/0097366 | A1* | 4/2010 | Kitayama | G09G 3/3614 345/213 |
| 2013/0027378 | A1* | 1/2013 | Lee | G09G 3/3677 345/212 |
| 2014/0240209 | A1* | 8/2014 | Zhang | G09G 3/3648 345/92 |
| 2015/0268777 | A1* | 9/2015 | Okamura | G06F 3/0412 345/205 |
| 2016/0140922 | A1* | 5/2016 | Dai | G11C 19/287 345/92 |
| 2016/0148568 | A1* | 5/2016 | Wang | G09G 3/32 345/212 |
| 2016/0189648 | A1* | 6/2016 | Xiao | G09G 3/3677 345/212 |
| 2016/0343332 | A1* | 11/2016 | Cao | G09G 3/3677 |
| 2017/0229083 | A1* | 8/2017 | Du | G09G 3/3677 |
| 2017/0329442 | A1* | 11/2017 | Wang | G06F 3/0412 |

FOREIGN PATENT DOCUMENTS

| | | | | |
|---|---|---|---|---|
| CN | 103956137 | A | | 7/2014 |
| CN | 103996370 | A | | 8/2014 |
| CN | 203760057 | U | | 8/2014 |
| CN | 104036738 | | * | 9/2014 ........... G06F 3/0416 |
| CN | 104036738 | A | | 9/2014 |
| CN | 105427824 | A | | 3/2016 |
| WO | 2015003434 | A1 | | 1/2015 |

OTHER PUBLICATIONS

Transistor , various, 1926.*
English translation of International Search Report and Written Opinion dated Oct. 28, 2016, for PCT/CN2016/097310.
International Search Report and Written Opinion (including English translation of Box V) dated Oct. 28, 2016, for PCT/CN2016/097310.
First Chinese Office Action dated Jul. 21, 2016 for corresponding Chinese Application No. 201610006849.9.

* cited by examiner

GATE DRIVING CIRCUIT, ARRAY SUBSTRATE, DISPLAY PANEL AND DRIVING METHOD

CROSS-REFERENCE TO RELATED APPLICATIONS

The present disclosure claims a benefit from Chinese Patent Application No. 201610006849.9 filed on Jan. 5, 2016, which is incorporated here by reference in its entirety.

TECHNICAL FIELD

The present disclosure relates to Liquid Crystal Display (LCD) technology, and more particularly, to a gate driving circuit, an array substrate, a display panel and a driving method.

BACKGROUND

In the conventional In-Cell touch screen technology, after display scanning of several lines of pixels in an Active Area (AA), the display scanning is stopped to scan some touch electrodes in the AA. Each time period during which the touch electrodes are scanned is referred to as a Long Horizontal Blanking (LHB). Then, the display scanning and the LHB are alternated and repeated for a number of times (depending on specific products), so as to accomplish the display of one frame of picture and the scanning of touch electrodes over the entire screen.

SUMMARY

The embodiments of the present disclosure provide a gate driving circuit, an array substrate, a display panel and a driving method, capable of avoiding abnormal display due to electrical leakage at PU.

In an aspect of the embodiments of the present disclosure, a gate driving circuit is provided. The gate driving circuit comprises: at least a Gate driver on Array (GOA) unit at stage n, $GOA_n$, and a GOA unit at stage n+m, $GOA_{n+m}$, an output terminal of $GOA_n$ being connected to an input terminal of $GOA_{n+m}$, an output terminal of $GOA_{n+m}$ being connected to a reset terminal of $GOA_n$, where n and m are natural numbers; a signal line providing an electrical leakage compensation signal $V_{LHB}$; and an electrical leakage compensation module having two input terminals connected to output terminals of $GOA_n$ and $GOA_{n+m}$, respectively, a control terminal connected to the signal line, and an output terminal connected to a Pull-Up (PU) node of $GOA_{n+m}$, and configured to compensate for a voltage at the PU node of $GOA_{n+m}$ in response to receipt of the electrical leakage compensation signal $V_{LHB}$.

In another aspect of the embodiments of the present disclosure, an array substrate is provided. The array substrate comprises the above gate driving circuit and a number of gate lines. The gate driving circuit includes N GOA units, the number of gate lines is also N, and each of the gate lines has a back terminal connected to the output terminal of its corresponding GOA unit, where N is a natural number and n+m≤N.

In yet another aspect of the embodiments of the present disclosure, a display panel is provided. The display panel comprises the above array substrate and a pixel matrix. The output terminal of each GOA unit of the gate driving circuit in the array substrate is connected to a gate line of its corresponding pixel line in the pixel matrix.

In yet a further aspect of the embodiments of the present disclosure, a driving method for the gate driving circuit according to the embodiment of the present disclosure is provided. The driving method comprises: a display scanning phase in which the electrical leakage compensation signal is at a first level; a compensation phase in which the electrical leakage compensation signal is at a second level, such that the electrical leakage compensation module compensates for the voltage at the PU node of the GOA unit, $GOA_{n+m}$; and a resetting phase in which the electrical leakage compensation module is reset in response to the electrical leakage compensation signal being switched from the second level to the first level.

According to the embodiments of the present disclosure, an electrical leakage compensation module is added between two cascaded GOA units in the gate driving circuit for compensating for a voltage at the PU node of the GOA unit at the next stage, i.e., compensating for a voltage decrease due to electrical leakage, so as to solve at least the problem associated with abnormal display due to electrical leakage at PU.

Further, the PU electrical leakage compensation module can be implemented to include four TFTs and one capacitor. Only one additional signal line is required. The overall circuit structure is simple and easy to implement.

Moreover, a PU electrical leakage compensation module can be provided between every two cascaded GOA units in the gate driving circuit, such that, when the relative position of the LHB is to be changed, only the electrical leakage compensation signal $V_{LHB}$ needs to be adjusted accordingly. In this way, the flexibility in the design of the gate driving circuit can be improved.

DETAILED DESCRIPTION OF THE EMBODIMENTS

Figure 1A:
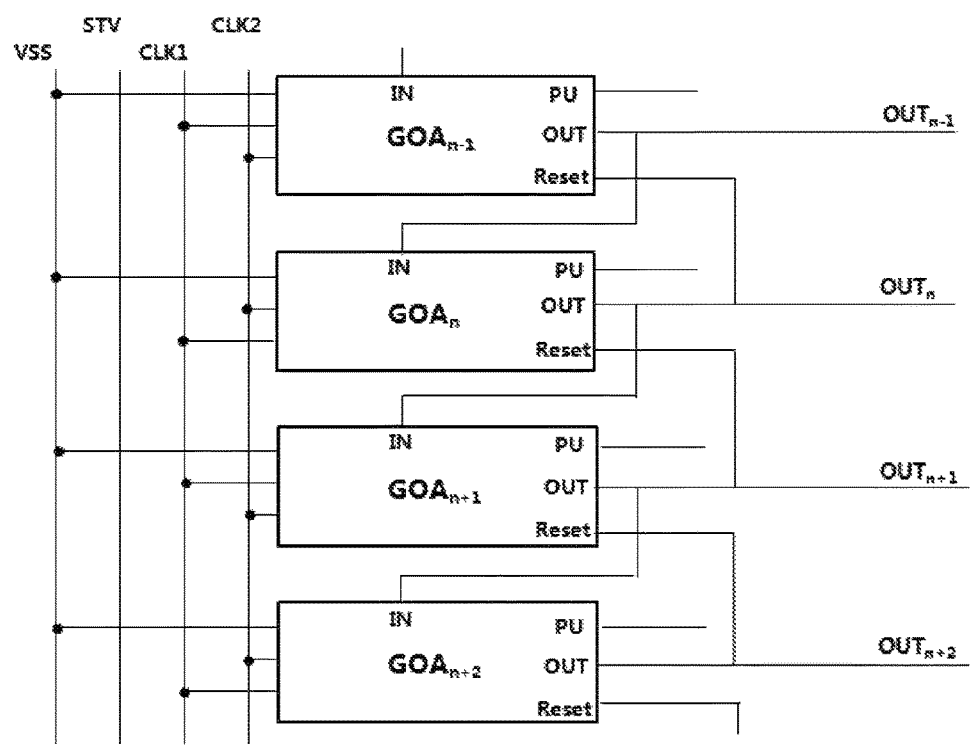
FIG. 1A is a schematic diagram showing a conventional gate driving circuit.

Gate driver on Array (GOA) is a technique for integrating a gate driver on an array substrate so as to facilitate miniaturization of the array substrate. FIG. 1A shows a conventional gate driving circuit. Referring to FIG. 1A, the gate driving circuit typically includes a number of GOA units: a GOA unit at stage n−1, $GOA_{n-1}$, a GOA unit at stage n, $GOA_n$, a GOA unit at stage n+1, $GOA_{n+1}$, a GOA unit at stage n+2, $GOA_{n+2}$, . . . . Each GOA unit has its output terminal ($OUT_{n-1}$, $OUT_n$, $OUT_{n+1}$, $OUT_{n+2}$) connected to a gate line of its corresponding pixel line on a touch screen, where n is a natural number larger than 1. As shown in FIG. 1A, the output terminal $OUT_n$ of $GOA_n$ is connected to an input terminal IN of the GOA unit at the next stage, $GOA_{n+1}$, for turning on $GOA_{n+1}$. Meanwhile, the output terminal $OUT_{n+1}$ of the GOA unit at the next stage, $GOA_{n+1}$, is connected to a reset terminal (RESET) of the GOA unit at the previous stage, $GOA_{n-1}$. As a start signal, STV is connected to the input terminal (IN) of the GOA unit at the first stage in the gate driving circuit. Here, CLK1 and CLK2 are clock signals of the gate driving circuit. A clock signal input terminal of each of $GOA_n$ and $GOA_{n+2}$ is connected to the first clock signal CLK1, and a clock signal input terminal of each of $GOA_{n-1}$ and $GOA_{n+1}$ is connected to the second clock signal CLK2. When the first clock signal CLK1 and the second clock signal CLK2 are at a high level, each corresponding GOA unit in the gate driving circuit outputs the high level, such that a gate line connected to the GOA unit is turned on. When the first clock signal CLK1 and the second clock signal CLK2 are at a low level, each corresponding GOA unit in the gate driving circuit outputs the low level, such that a gate line connected to the GOA unit is turned off. In order to scan the gate lines individually, the high levels of the first clock signal CLK1 and the second clock signal CLK2 occur alternately.

Figure 1B:
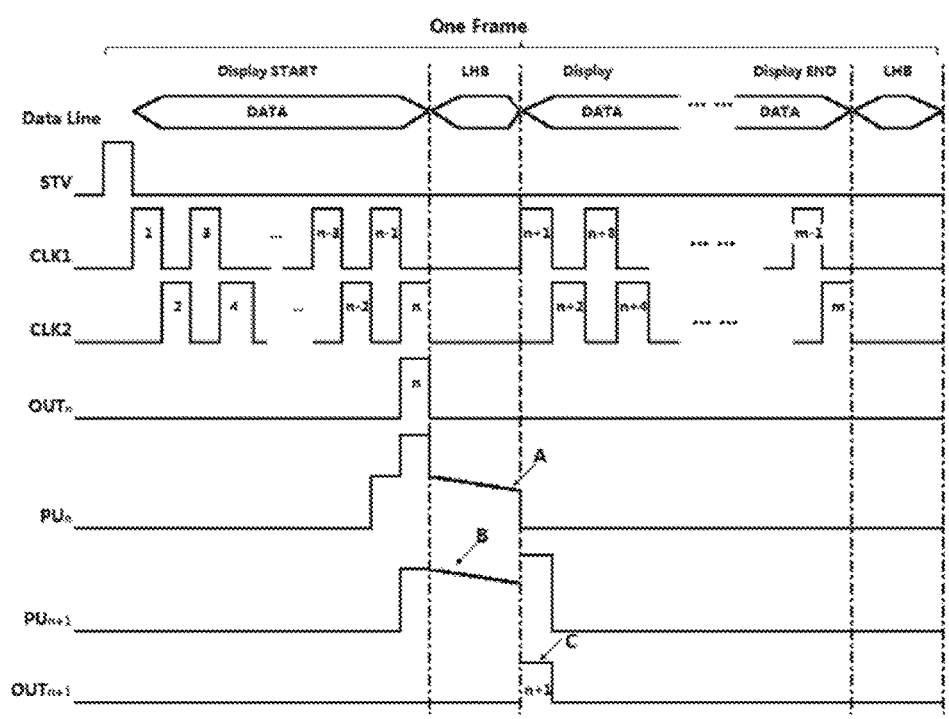
FIG. 1B is a time sequence diagram of the gate driving circuit shown in FIG. 1A.

FIG. 1B is a time sequence diagram of the gate driving circuit shown in FIG. 1A. Referring to FIG. 1B, it is assumed that the pixel line n enters LHB period after completing data display and starts touch electrode scanning. When $OUT_n$ is at the high level, the level at the PU node, $PU_{n+1}$, within the GOA unit at stage n+1, $GOA_{n+1}$, is also pulled up. However, during the LHB period (typically on the order of milliseconds), the PU node within $GOA_{n+1}$ will have an electrical leakage via a source and a drain of a TFT connected to it and thus a voltage decrease, as shown at B in FIG. 1B. At the end of the LHB, the output voltage from the GOA unit $GOA_{n+1}$ will be even too low to turn on pixel TFTs on the corresponding line, resulting in abnormal display, as shown at C in FIG. 1B. Meanwhile, the output terminal of $GOA_{n+1}$ is connected to the reset terminal of the GOA unit at stage n, $GOA_n$, and has a low voltage such that the output terminal and the PU node, $PU_n$ of $GOA_n$ cannot discharge normally and thus cannot be completely turned off, leading to high noise and potentially abnormal display, as shown at A in FIG. 1B.

According to the embodiments of the present disclosure, a PU electrical leakage compensation module is added between two stages of gate driving circuits for charging the PU node of the GOA unit at the next stage, thereby avoiding abnormal display due to electrical leakage at PU.

In the following, the embodiments of the present disclosure will be described in further detail with reference to the figures, such that the objects, solutions and advantages of the embodiments of the present disclosure will become more apparent.

Figure 2A:
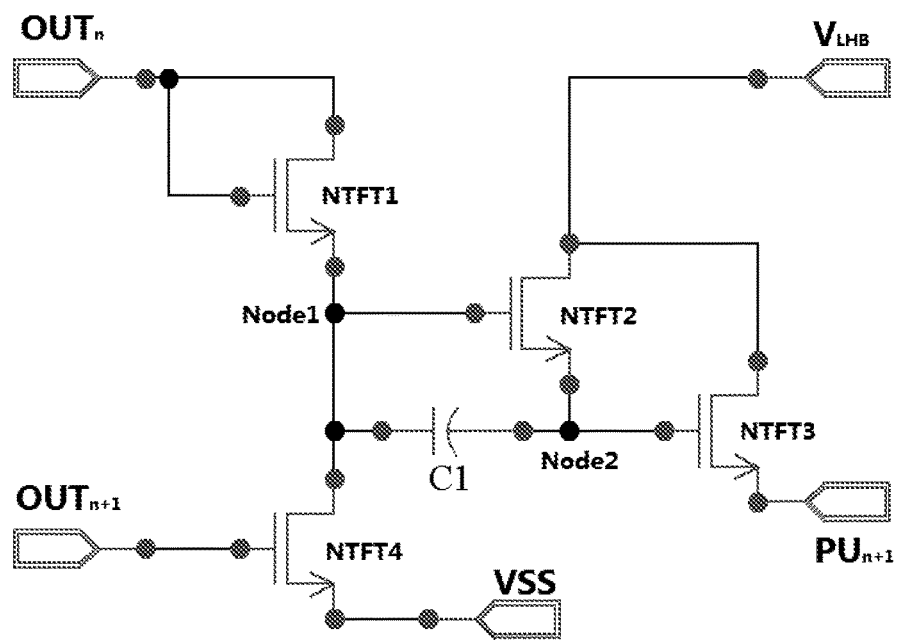
FIG. 2A is a schematic diagram showing a structure of a gate driving circuit according to an example embodiment of the present disclosure.

According to the exemplary embodiment of the present disclosure, a gate driving circuit is provided. Referring to FIG. 2A, the gate driving circuit according to this embodiment includes:

N GOA units, including a GOA unit at stage n, $GOA_n$, and a GOA unit at stage n+1, $GOA_{n+1}$, which are cascaded, an output terminal of $GOA_n$ being connected to an input terminal of $GOA_{n+1}$, an output terminal of $GOA_{n+1}$ being connected to a reset terminal of $GOA_n$, where n is a natural number and n+1≤N;

a signal line providing an electrical leakage compensation signal $V_{LHB}$; and an electrical leakage compensation module having two input terminals connected to output terminals of $GOA_n$ and $GOA_{n+1}$, respectively, a control terminal connected to the signal line, and an output terminal connected to a PU node of $GOA_{n+1}$, and configured to compensate for a voltage at the PU node of $GOA_{n+1}$ in response to receipt of the electrical leakage compensation signal.

The respective components of the gate driving circuit according to this embodiment will be explained in detail below.

It can be appreciated by those skilled in the art that, while only four GOA units are shown for the gate driving circuit in FIG. 1A, similar connection relations can be applied to a gate driving circuit containing N GOA units as a whole. $GOA_n$ and $GOA_{n+m}$ are two cascaded GOA units of the N GOA units.

Further, in this embodiment, two adjacent GOA units are cascaded. That is, the output terminal of the GOA unit at stage n, $GOA_n$, is connected to the input terminal of the GOA unit at stage n+1, $GOA_{n+1}$, and the output terminal of the GOA unit at stage n+1, $GOA_{n+1}$, is connected to the reset terminal of the GOA unit at stage n, $GOA_n$. However, there may be alternative cascading schemes. For example, there can be a scheme with pre-charging, that is, the output terminal of $GOA_n$ can be connected to an input terminal of a GOA unit at stage n+m, $GOA_{n+m}$, and an output terminal of $GOA_{n+m}$ can be connected to the reset terminal of $GOA_n$, where m can be any of 2, 3, 4, 5 and 6. In this case, an electrical leakage compensation module can be provided between two cascaded GOA units, $GOA_n$ and $GOA_{n+m}$.

Moreover, this embodiment is explained assuming that the pixel line n enters the LHB period after completing display, i.e., the PU node of the GOA unit at the next stage, $GOA_{n+1}$ is charged after each LHB, so as to avoid abnormal display due to electrical leakage at the PU node of $GOA_{n+1}$. The present disclosure is not limited to whether an electrical leakage compensation module is added between other GOA units or not.

It can be appreciated by those skilled in the art that the relative position of the LHB can be adjusted depending on actual scenarios. Particularly, during a test phase, a tester may change the relative position of the LHB several times to achieve optimal display and touch functions. When the position of the LHB is changed, in order to ensure the voltage at the PU node of the GOA unit at the corresponding position to be compensated for, in a preferred embodiment of the present disclosure, an electrical leakage compensation module can be provided between every two cascaded GOA units in the gate driving circuit. Thus, when the position of the LHB is changed by the tester, only the timing sequence of the $V_{LHB}$ signal needs to be adjusted accordingly. In this way, the flexibility in the design of the gate driving circuit can be improved.

In this embodiment, the Thin Film Transistors (TFTs) in the GOA units are N-type TFTs which are on at the high level. Accordingly, the TFTs in the electrical leakage compensation module can be N-type TFTs.

In particular, referring to FIG. 2A, the electrical leakage compensation module includes:

a first N-type TFT, NTFT1, having its gate and drain connected to the output terminal of the GOA unit at stage n, $GOA_n$, and its source connected to a first node, Node1;

a fourth N-type TFT, NTFT4, having its gate connected to the output terminal of the GOA unit at stage n+1, $GOA_{n+1}$, its drain connected to the first node Node1 and its source connected to a voltage VSS;

a second N-type TFT, NTFT2, having its gate connected to the first node Node1, its drain connected to the signal line and its source connected to a second node, Node2, a pull-up capacitor, C2, being provided between the second node Node2 and the first node Node1;

a third N-type TFT, NTFT3, having its gate connected to the second node Node2, its drain connected to the signal line and its source connected to the output terminal of the electrical leakage compensation module and thus to the PU node of $GOA_{n+1}$ (i.e., $PU_{n+1}$ shown in the figure).

Here, the voltage VSS is maintained at the low level. The electrical leakage compensation signal $V_{LHB}$ is at the low level during display scanning and at the high level in most of the time within the LHB, and becomes low when the LHB is about to end (e.g., a few microseconds before the end of the LHB). That is, the electrical leakage compensation signal is at the high level during the LHB period, except the preset time period before the end of the LHB when it is at the low level. The preset time period can be selected between 0.1 μs and 20 μs based on the time required for setting the second node Node2 in the electrical leakage compensation module to the low level, which depends on the sizes of the four NTFTs.

Further, the pull-up capacitor C1 can have a capacitance value ranging from 1 pF to 10 pF, taking into account both the performance and the occupied area.

It is to be noted here that the only function of the electrical leakage compensation module is to charge the PU node, $PU_{n+1}$, of the $GOA_{n+1}$ unit. There is no high requirement on the sizes of the TFTs, as long as the above function can be achieved. Hence, the overall size of the gate driving circuit will not be significantly influenced.

Figure 2B:
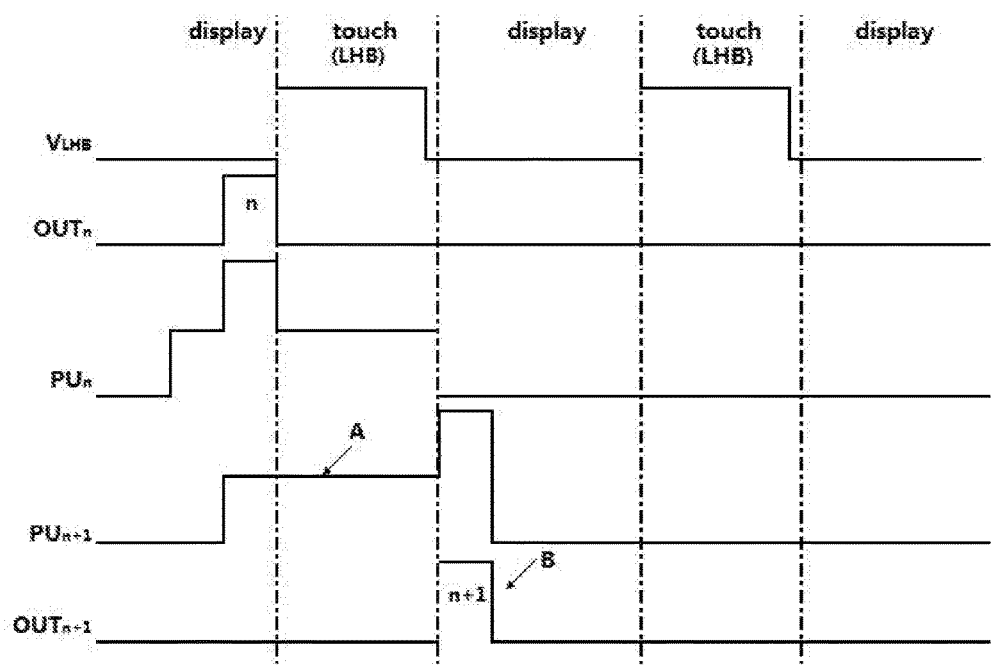
FIG. 2B is a time sequence diagram of the gate driving circuit shown in FIG. 2A.

Next, the working principles of the gate driving circuit according to this embodiment will be detailed with reference to the timing sequence shown in FIG. 2B.

(1) In a display scanning phase, $V_{LHB}$ is at the low level.

When $OUT_n$ is at the low level, the first N-type TFT, NTFT1, the second N-type TFT, NTFT2, the third N-type TFT, NTFT3, and the fourth N-type TFT, NTFT4, are all off. The electrical leakage compensation module is disabled.

When $OUT_n$ becomes high, the first N-type TFT, NTFT1, is turned on, the voltage at the first node Node1 is pulled up, the second N-type TFT, NTFT2, is on and the voltage at the second node Node2 is pulled down by the electrical leakage compensation signal $V_{LHB}$, such that the third N-type TFT, NTFT3, remains off.

As above, in the display scanning phase, the electrical leakage compensation module has not impact on any GOA unit.

(2) During the LHB period, the electrical leakage compensation signal $V_{LHB}$ is at the high level in most of the time. When the LHB begins, $OUT_n$ becomes low and the first N-type TFT, NTFT1, is off. However, Node1 has been charged to nearly the high level by $OUT_n$ and the second N-type TFT, NTFT2, remains on. At this time, the electrical leakage compensation signal $V_{LHB}$ is set to the high level and the second node Node2 is pulled up to the high level by the electrical leakage compensation signal $V_{LHB}$, such that the third N-type TFT, NTFT3, is turned on and $PU_{n+1}$ becomes high. In this case, due to the bootstrapping effect of the pull-up capacitor C1, the voltage at the first node Node1 will transition to almost twice the voltage at the second node Node2, such that the second N-type TFT, NTFT2, remains on. Node2 is charged by $V_{LHB}$ continuously, such that the third N-type TFT, NTFT3, remains on. Thus, $PU_{n+1}$ can be charged by $V_{LHB}$, such that the voltage at $PU_{n+1}$ can be compensated for, as shown at A in FIG. 2B. The time period in which the electrical leakage compensation signal $V_{LHB}$ is at the high level can be referred to as "compensation phase" in which the voltage at $PU_{n+1}$ is compensated for.

The electrical leakage compensation signal $V_{LHB}$ is set to the low level a few microseconds before the end of the LHB. The voltage at the second node Node2 is pulled down to the low level, such that the third N-type TFT, NTFT3, is turned off and $PU_{n+1}$ will no longer be influenced. As shown at B in FIG. 2B, then $OUT_{n+1}$ becomes high, the fourth N-type TFT, NTFT4, is turned on, the voltage at the first node Node1 is pulled down by VSS, such that the second N-type TFT, NTFT2, is turned off. Then, $OUT_{n+1}$ becomes low, such that the fourth N-type TFT, NTFT4, is turned off. In this case, all the TFTs in the electrical leakage compensation module are off and the electrical leakage compensation module is reset. This time period can be referred to as "reset phase". As discussed above, the reset phase includes the preset time period, i.e., the period from the electrical leakage compensation signal $V_{LHB}$ being set to the low level to $OUT_{n+1}$ becoming high. Based on the time required for setting the second node Node2 in the electrical leakage compensation module to the low level, the preset time period can range from 0.1 μs to 20 μs, depending on the sizes of the four TFTs.

Figure 3A:
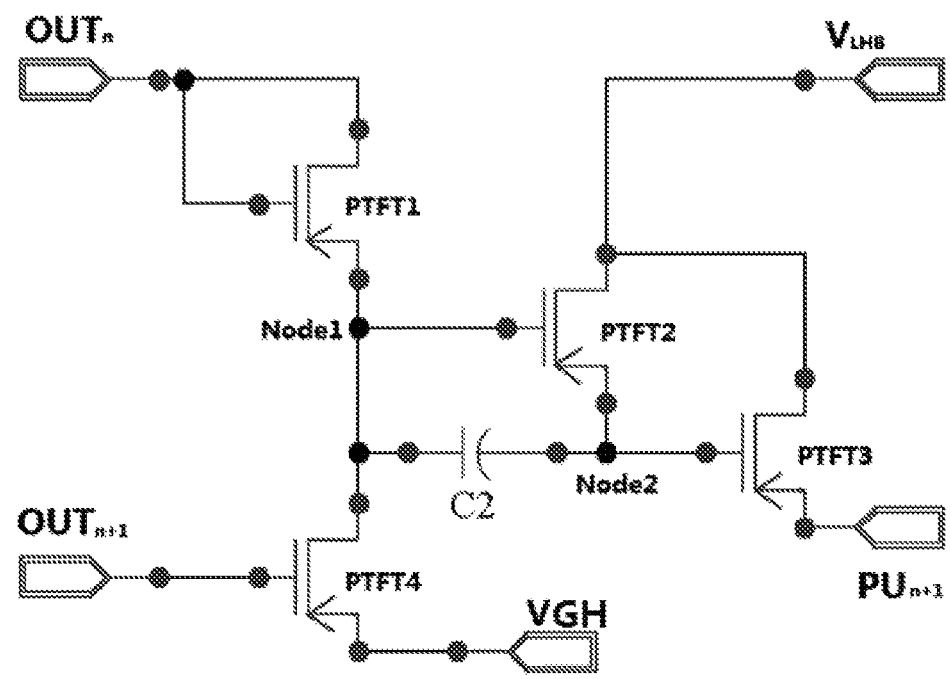
FIG. 3A is a schematic diagram showing a structure of a gate driving circuit according to an another example embodiment of the present disclosure.

According to the another exemplary embodiment of the present disclosure, a gate driving circuit is also provided. As shown in FIG. 3A, this embodiment differs from the embodiment in FIG. 2A in that the TFTs in the GOA units are P-type TFTs which are on at the low level. Accordingly, the TFTs in the electrical leakage compensation module can be P-type TFTs.

Referring to FIG. 3A, the electrical leakage compensation module according to this embodiment includes:

a first P-type TFT, PTFT1, having its gate and source connected to the output terminal of the GOA unit at stage n, $GOA_n$, and its drain connected to a first node, Node1;

a fourth P-type TFT, PTFT4, having its gate connected to the output terminal of the GOA unit at stage n+1, $GOA_{n+1}$, its source connected to the first node Node1 and its drain connected to a voltage VGH;

a second P-type TFT, PTFT2, having its gate connected to the first node Node1, its source connected to the signal line and its drain connected to a second node, Node2, a pull-down capacitor, C2 being provided between the second node Node2 and the first node Node1;

a third P-type TFT, PTFT3, having its gate connected to the second node Node2, its source connected to the signal line and its drain connected to the output terminal of the electrical leakage compensation module and thus to the PU node of $GOA_{n+1}$ (i.e., $PU_{n+1}$ shown in the figure).

In this embodiment, the voltage VGH is maintained at the high level. The electrical leakage compensation signal $V_{LHB}$ is at the high level during display scanning and at the low level in most of the time within the LHB, and becomes high when the LHB is about to end (e.g., a few microseconds before the end of the LHB). That is, the electrical leakage compensation signal is at the low level during the LHB period, except the preset time period before the end of the LHB when it is at the high level. The preset time period can be selected between 0.1 μs and 20 μs based on the time required for setting the second node Node2 in the electrical leakage compensation module to the high level, which depends on the sizes of the four PTFTs.

Likewise, the pull-down capacitor C2 can have a capacitance value ranging from 1 pF to 10 pF, taking into account both the performance and the occupied area.

Figure 3B:
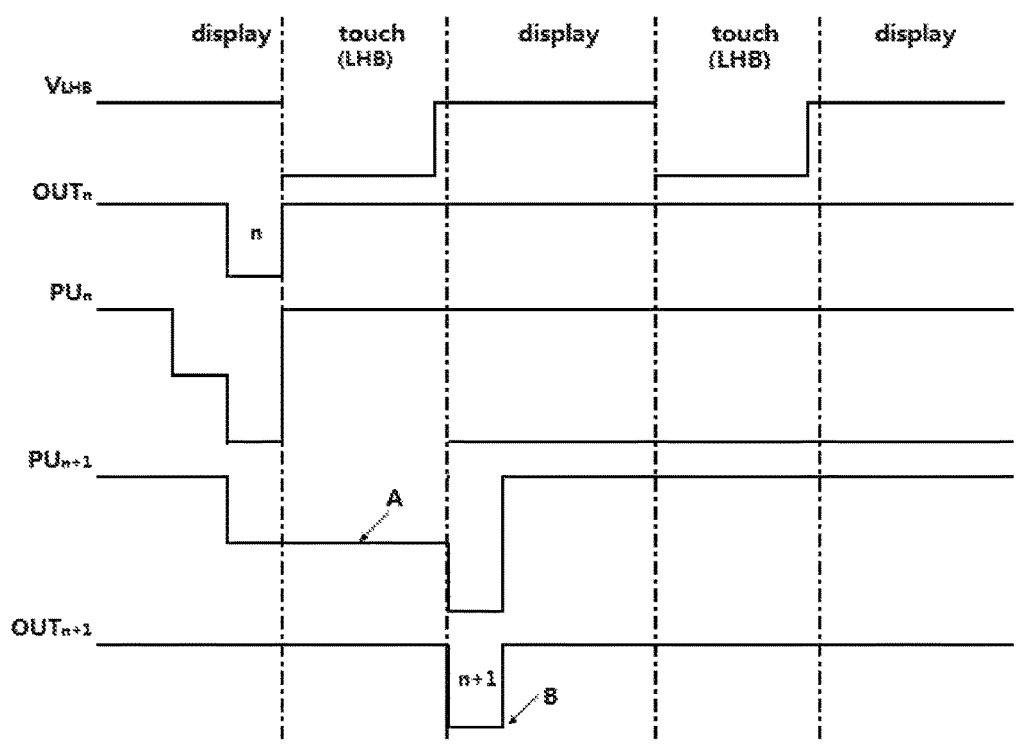
FIG. 3B is a time sequence diagram of the gate driving circuit shown in FIG. 3A.

Next, the working principles of the gate driving circuit according to this embodiment will be detailed with reference to the timing sequence shown in FIG. 3B.

(1) In a display scanning phase, $V_{LHB}$ is at the high level.

When $OUT_n$ is at the high level, the first P-type TFT, PTFT1, the second P-type TFT, PTFT2, the third P-type TFT, PTFT3, and the fourth P-type TFT, PTFT4, are all off. The electrical leakage compensation module is disabled.

When $OUT_n$ becomes low, the first P-type TFT, PTFT1, is turned on, the voltage at the first node Node1 is pulled down, the second P-type TFT, PTFT2, is on and the voltage at the second node Node2 is pulled up by the electrical leakage compensation signal $V_{LHB}$, such that the third P-type TFT, PTFT3, remains off.

As above, in the display scanning phase, the electrical leakage compensation module has not impact on any GOA unit.

(2) During the LHB period, the electrical leakage compensation signal $V_{LHB}$ is at the low level in most of the time. When the LHB begins, $OUT_n$ becomes high and the first P-type TFT, PTFT1, is off. However, Node1 has been charged to nearly the low level by $OUT_n$ and the second P-type TFT, PTFT2, remains on. At this time, the electrical leakage compensation signal $V_{LHB}$ is set to the low level and the second node Node2 is pulled down to the low level by the electrical leakage compensation signal $V_{LHB}$ and Node2 is pulled down to the low level. Due to the bootstrapping effect of the pull-down capacitor C2, the voltage at the first node Node1 will transition to almost twice the voltage at the second node Node2, such that the second P-type TFT, PTFT2, remains on. Node2 is charged by the electrical leakage compensation signal $V_{LHB}$ continuously, such that the third P-type TFT, PTFT3, remains on. Thus, $PU_{n+1}$ can be charged by $V_{LHB}$, as shown at A in FIG. 3B. The time period in which the electrical leakage compensation signal $V_{LHB}$ is at low high level can be referred to as "compensation phase" in which the voltage at $PU_{n+1}$ is compensated for.

The electrical leakage compensation signal $V_{LHB}$ is set to the high level a few microseconds before the end of the LHB. The voltage at the second node Node2 is pulled up to the high level, such that the third P-type TFT, PTFT3, is turned off and $PU_{n+1}$ will no longer be influenced. As shown at B in FIG. 3B, then $OUT_{n+1}$ becomes low, the fourth P-type TFT, PTFT4, is turned on, the voltage at the first node Node1 is pulled up by VGH, such that the second P-type TFT, PTFT2, is turned off. Then, $OUT_{n+1}$ becomes high, such that the fourth P-type TFT, PTFT4, is turned off. In this case, all the TFTs in the electrical leakage compensation module are off and the electrical leakage compensation module is reset. This time period can be referred to as "reset phase". As discussed above, the reset phase includes the preset time period, i.e., the period from the electrical leakage compensation signal $V_{LHB}$ being set to the high level to $OUT_{n+1}$ becoming low. Based on the time required for setting the second node Node2 in the electrical leakage compensation module to the high level, the preset time period can range from 0.1 µs to 20 µs, depending on the sizes of the four TFTs.

For simplicity, any technical feature in the embodiment that may have the same function here is incorporated herein and the description thereof will be omitted here.

Based on the gate driving circuits according to the above embodiments, according to an exemplary embodiment of the present disclosure, an array substrate is provided. The array substrate according to this embodiment includes the above gate driving circuit and a number of gate lines.

The gate driving circuit includes N GOA units, with an electrical leakage compensation module provided between every two adjacent GOA units. The number of gate lines is also N, and each of the gate lines has a back terminal connected to the output terminal of its corresponding GOA unit.

Based on the array substrate according to the above amendment, according to an exemplary embodiment of the present disclosure, a display panel is provided. The display panel includes the above array substrate and a pixel matrix. The output terminal of each GOA unit of the gate driving circuit in the array substrate is connected to a gate line of its corresponding pixel line in the pixel matrix.

Figure 4:
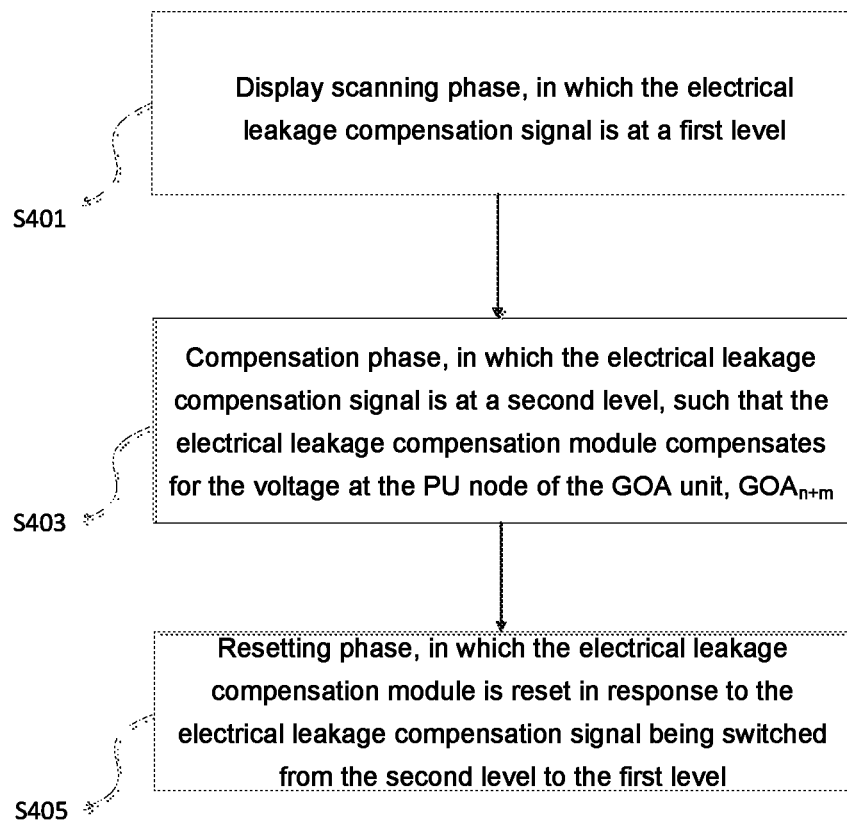
FIG. 4 is a flowchart illustrating a driving method according to an embodiment of the present disclosure.

FIG. 4 is a flowchart illustrating a driving method according to an embodiment of the present disclosure. As shown in FIG. 4, a driving method 40 for the gate driving circuit according to the embodiment of the present disclosure includes the following steps.

At step 401, in a display scanning phase, the electrical leakage compensation signal is at a first level.

At step 403, in a compensation phase, the electrical leakage compensation signal is at a second level, such that the electrical leakage compensation module compensates for the voltage at the PU node of the GOA unit, $GOA_{n+m}$.

At step 405, in a resetting phase, the electrical leakage compensation module is reset in response to the electrical leakage compensation signal being switched from the second level to the first level.

Next, the driving method according to this embodiment, when applied to the gate driving circuit shown in FIG. 2A, will be explained in detail with reference to FIGS. 2A, 2B and 4.

First, in the display scanning phase, when the output terminal of the GOA unit at stage n, $GOA_n$, is at a low level, the first N-type TFT, the second N-type TFT, the third N-type TFT and the fourth N-type TFT are all off. When the output terminal of the GOA unit at stage n, $GOA_n$, becomes high, the first N-type TFT and the second N-type TFT are on and the third N-type TFT and the fourth N-type TFT are off.

In the compensation phase, the first N-type TFT is off, the second N-type TFT remains on and the third N-type TFT is on, such that a voltage at $PU_{n+1}$ is pulled up.

In the resetting phase, when the output terminal of the GOA unit $GOA_{n+m}$ is at the high level, the first N-type TFT, the second N-type TFT and the third N-type TFT are off and the fourth N-type TFT is on. In response to the output terminal of the GOA unit $GOA_{n+m}$ being switched from the high level to the low level, the first N-type TFT, the second N-type TFT, the third N-type TFT and the fourth N-type TFT are all off.

Next, the driving method according to this embodiment, when applied to the gate driving circuit shown in FIG. 3A, will be explained in detail with reference to FIGS. 3A, 3B and 4.

In the display scanning phase, when the output terminal of the GOA unit at stage n, $GOA_n$, is at a high level, the first P-type TFT, the second P-type TFT, the third P-type TFT and the fourth P-type TFT are all off. When the output terminal of the GOA unit at stage n, $GOA_n$, becomes low, the first P-type TFT and the second P-type TFT are on and the third P-type TFT and the fourth P-type TFT are off.

In the compensation phase, the first P-type TFT is off, the second P-type TFT remains on and the third P-type TFT is on, such that a voltage at $PU_{n+1}$ is pulled down.

In the resetting phase, when the output terminal of the GOA unit $GOA_{n+m}$ is at the low level, the first P-type TFT, the second P-type TFT and the third P-type TFT are off and the fourth P-type TFT is on. In response to the output terminal of the GOA unit $GOA_{n+m}$ being switched from the low level to the high level, the first P-type TFT, the second P-type TFT, the third P-type TFT and the fourth P-type TFT are all off.

It is to be noted that, all the implementations not described or depicted in the description or figures are well known to those skilled in the art and the details thereof are thus omitted. Further, the definitions of the various elements and methods as described above are not limited to the specific structures, shapes or schemes as described in connection with the embodiments. Rather, various modifications or alternatives can be readily made by those skilled in the art.

In summary, the embodiments of the present disclosure provide a gate driving circuit, an array substrate including the gate driving circuit and a display panel. The gate driving circuit has a PU electrical leakage compensation module, and with one signal line added, it can charge the PU node within the GOA unit on the next line after the end of the LHB within the LHB period, so as to avoid abnormal display due to electrical leakage at the PU node and improve the display stability. Moreover, this compensation structure allows the relative position of the LHB to be changed, by simply adjusting the $V_{LHB}$ signal accordingly, thereby achieving an improved flexibility.

The objects, solutions and advantageous effects of the present disclosure have been described in detail with reference to the above embodiments. It can be appreciated that the above embodiments are illustrative only and are not intended to limit the scope of the present disclosure. Any modification, equivalents and improvements made without departing from the spirits and principles of the embodiments of the present disclosure are to be encompassed by the scope of the present disclosure.

What is claimed is:

1. A driving method for a gate driving circuit, the gate driving circuit comprising:
    at least a Gate driver on Array (GOA) unit at stage n, GOAn, and a GOA unit at stage n+m, GOAn+m, an output terminal of GOAn being connected to an input terminal of GOAn+m, and an output terminal of GOAn+m being connected to a reset terminal of GOAn, where n and m are natural numbers;
    a signal line providing an electrical leakage compensation signal VLHB; and
    an electrical leakage compensation sub circuit having two input terminals connected to output terminals of GOAn and GOAn+m, respectively, a control terminal connected to the signal line, and an output terminal connected to a Pull-Up (PU) node of GOAn+m, the electrical leakage compensation sub circuit being configured to compensate for a voltage at the PU node of GOAn+m in response to the electrical leakage compensation signal VLHB,
wherein the driving method comprises:
    a display scanning phase in which the electrical leakage compensation signal is at a first level;
    a compensation phase in which the electrical leakage compensation signal is at a second level, such that the electrical leakage compensation sub circuit compensates for the voltage at the PU node of the GOA unit, GOAn+m; and
    a resetting phase in which the electrical leakage compensation sub circuit is reset in response to the electrical leakage compensation signal being switched from the second level to the first level,
wherein the electrical leakage compensation sub circuit comprises a first N-type TFT, a second N-type TFT, a third N-type TFT and a fourth N-type TFT, the first level is low level and the second level is a high level, and wherein:
    in the display scanning phase, when the output terminal of the GOA unit at stage n, $GOA_n$, is at a low level, the first N-type TFT, the second N-type TFT, the third N-type TFT and the fourth N-type TFT are all off; when the output terminal of the GOA unit at stage n, $GOA_n$, becomes high, the first N-type TFT and the second N-type TFT are on and the third N-type TFT and the fourth N-type TFT are off,
    in the compensation phase, the first N-type TFT is off, the second N-type TFT remains on and the third N-type TFT is on, such that a voltage at $PU_{n+1}$ is pulled up, and
    in the resetting phase, when the output terminal of the GOA unit $GOA_{n+m}$ is at the high level, the first N-type TFT, the second N-type TFT and the third N-type TFT are off and the fourth N-type TFT is on; in response to the output terminal of the GOA unit $GOA_{n+m}$ being switched from the high level to the low level, the first N-type TFT, the second N-type TFT, the third N-type TFT and the fourth N-type TFT are all off.

2. A driving method for a gate driving circuit, the gate driving circuit comprising:
    at least a Gate driver on Array (GOA) unit at stage n, GOAn, and a GOA unit at stage n+m, GOAn+m, an output terminal of GOAn being connected to an input terminal of GOAn+m, and an output terminal of GOAn+m being connected to a reset terminal of GOAn, where n and m are natural numbers;
    a signal line providing an electrical leakage compensation signal VLHB; and
    an electrical leakage compensation sub circuit having two input terminals connected to output terminals of GOAn and GOAn+m, respectively, a control terminal connected to the signal line, and an output terminal connected to a Pull-Up (PU) node of GOAn+m, the electrical leakage compensation sub circuit being configured to compensate for a voltage at the PU node of GOAn+m in response to the electrical leakage compensation signal VLHB,
wherein the driving method comprises:
    a display scanning phase in which the electrical leakage compensation signal is at a first level;
    a compensation phase in which the electrical leakage compensation signal is at a second level, such that the electrical leakage compensation sub circuit compensates for the voltage at the PU node of the GOA unit, GOAn+m; and
    a resetting phase in which the electrical leakage compensation sub circuit is reset in response to the electrical leakage compensation signal being switched from the second level to the first level,
wherein the electrical leakage compensation sub circuit comprises a first P-type TFT, a second P-type TFT, a third P-type TFT and a fourth P-type TFT, the first level is high level and the second level is a low level, and wherein:
    in the display scanning phase, when the output terminal of the GOA unit at stage n, $GOA_n$, is at a high level, the first P-type TFT, the second P-type TFT, the third P-type TFT and the fourth P-type TFT are all off; when the output terminal of the GOA unit at stage n, $GOA_n$, becomes low, the first P-type TFT and the second P-type TFT are on and the third P-type TFT and the fourth P-type TFT are off, in the compensation phase, the first P-type TFT is off, the second P-type TFT remains on and the third P-type TFT is on, such that a voltage at $PU_{n+1}$ is pulled down, and in the resetting phase, when the output terminal of the GOA unit $GOA_{n+m}$ is at the low level, the first P-type TFT, the second P-type TFT and the third P-type TFT are off and the fourth P-type TFT is on; in response to the output terminal of the GOA unit $GOA_{n+m}$ being switched from the low level to the high level, the first P-type TFT, the second P-type TFT, the third P-type TFT and the fourth P-type TFT are all off.

3. A gate driving circuit, comprising:

at least a Gate driver on Array (GOA) unit at stage n, $GOA_n$, and a GOA unit at stage n+m, $GOA_{n+m}$, an output terminal of $GOA_n$ being connected to an input terminal of $GOA_{n+m}$, an output terminal of $GOA_{n+m}$ being connected to a reset terminal of $GOA_n$, where n and m are natural numbers;

a signal line providing an electrical leakage compensation signal VLHB; and an electrical leakage compensation sub circuit having two input terminals connected to output terminals of $GOA_n$ and $GOA_{n+m}$, respectively, a control terminal connected to the signal line, and an output terminal connected to a Pull-Up (PU) node of $GOA_{n+m}$, and the electrical leakage compensation sub circuit is configured to compensate for a voltage at the PU node of $GOA_{n+m}$ in response to the electrical leakage compensation signal VLHB;

wherein the electrical leakage compensation sub circuit is further configured to compensate for the voltage at the PU node of $GOA_{n+m}$ in response to the electrical leakage compensation signal $V_{LHB}$ being switched from the second level to the first level so as to compensate for the voltage at the PU node of $GOA_{n+m}$ in a touch period after a display period for each image frame.

4. The gate driving circuit of claim 3, comprising N GOA units, wherein:

GOAn and GOAn+m are two cascaded GOA units of the N GOA units, where N is a natural number and N≥n+m.

5. The gate driving circuit of claim 4, wherein m=1, 2, 3, 4, 5, or 6.

6. The gate driving circuit of claim 4, comprising a plurality of electrical leakage compensation sub circuits each provided between any two cascaded GOA units of the N GOA units and having a control terminal connected to the signal line.

7. The gate driving circuit of claim 3, wherein GOAn and GOAn+m comprise N-type Thin Film Transistors (TFTs) which are on at a high level, and the electrical leakage compensation sub circuit comprises:

a first N-type TFT (NTFT1) having its gate and drain connected to the output terminal of GOAn and its source connected to a first node (Node1);

a fourth N-type TFT (NTFT4) having its gate connected to the output terminal of GOAn+1, its drain connected to the first node (Node1) and its source connected to a voltage VSS;

a second N-type TFT (NTFT2) having its gate connected to the first node (Node1), its drain connected to the signal line and its source connected to a second node (Node2), a pull-up capacitor (C1) being provided between the second node (Node2) and the first node (Node1); and a third N-type TFT (NTFT3) having its gate connected to the second node (Node2), its drain connected to the signal line and its source connected to the output terminal of the electrical leakage compensation sub circuit, wherein the voltage VSS is at a low level.

8. The gate driving circuit of claim 7, wherein the pull-up capacitor (C1) has a capacitance value ranging from 1 pF to 10 pF.

9. The gate driving circuit of claim 3, wherein GOAn and GOAn+m comprise P-type Thin Film Transistors (TFTs) which are on at a low level, and the electrical leakage compensation sub circuit comprises:

a first P-type TFT (PTFT1) having its gate and source connected to the output terminal of GOAn and its drain connected to a first node (Node1);

a fourth P-type TFT (PTFT4) having its gate connected to the output terminal of GOAn+1, its source connected to the first node (Node1) and its drain connected to a voltage VGH;

a second P-type TFT (PTFT2) having its gate connected to the first node (Node1), its source connected to the signal line and its drain connected to a second node (Node2), a pull-down capacitor (C2) being provided between the second node (Node2) and the first node (Node1);

a third P-type TFT (PTFT3) having its gate connected to the second node (Node2), its source connected to the signal line and its drain connected to the output terminal of the electrical leakage compensation sub circuit, wherein the voltage VGH is at a high level.

10. The gate driving circuit of claim 9, wherein the pull-down capacitor (C2) has a capacitance value ranging from 1 pF to 10 pF.

11. The gate driving circuit of claim 7, wherein the preset time period ranges from 0.1 μs to 20 μs.

12. An array substrate, comprising the gate driving circuit according to claim 3 and a number of gate lines, wherein the gate driving circuit includes N GOA units, the number of gate lines is also N, and each of the gate lines has a back terminal connected to the output terminal of its corresponding GOA unit.

13. A display panel, comprising the array substrate according to claim 12 and a pixel matrix, wherein the output terminal of each GOA unit of the gate driving circuit in the array substrate is connected to a gate line of its corresponding pixel line in the pixel matrix.

* * * * *